Oct. 1, 1940.   H. ERNST   2,216,550
MACHINE TOOL CONTROL MECHANISM
Filed Aug. 1, 1938   2 Sheets-Sheet 1
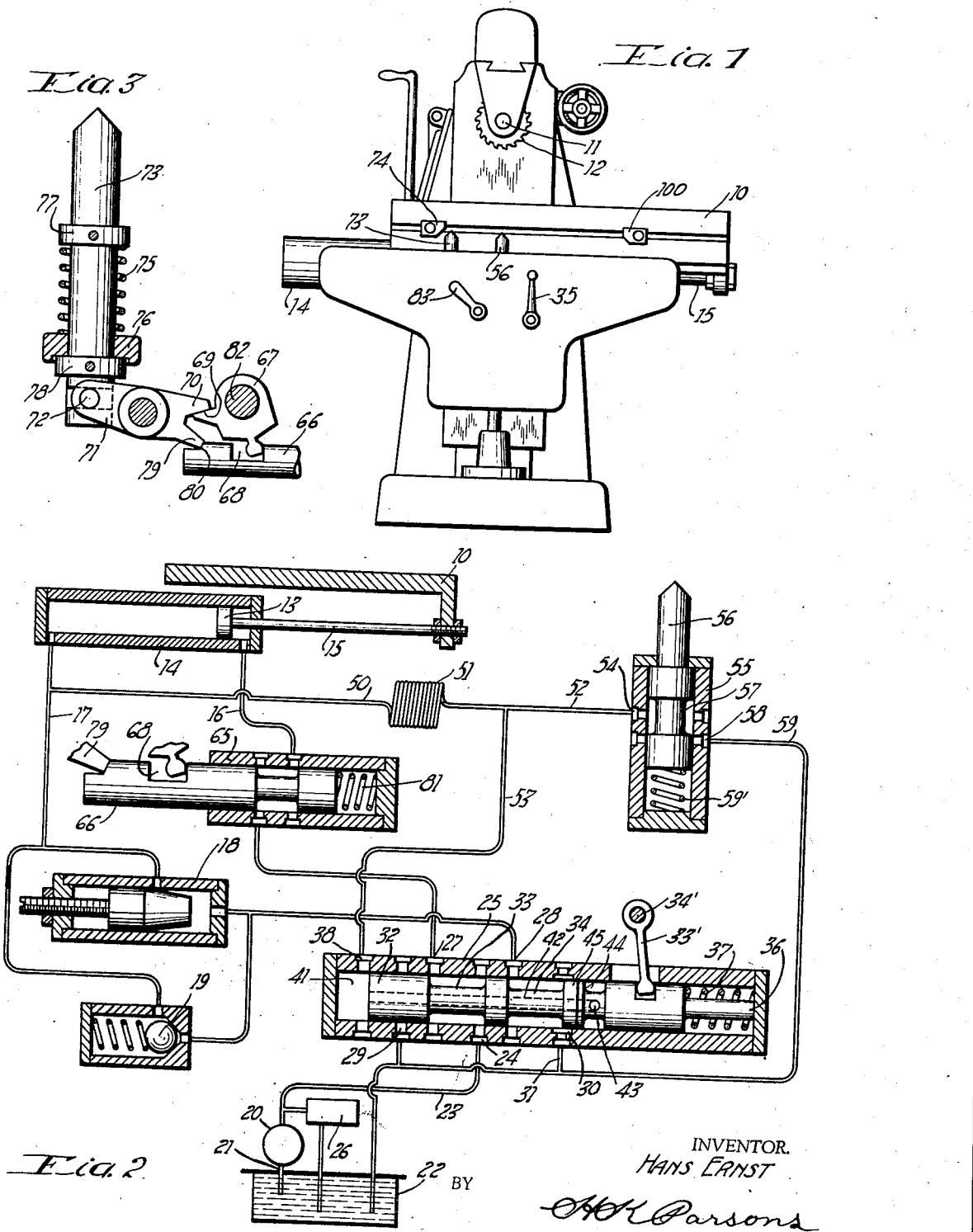

Oct. 1, 1940.  H. ERNST  2,216,550
MACHINE TOOL CONTROL MECHANISM
Filed Aug. 1, 1938  2 Sheets-Sheet 2

INVENTOR.
HANS ERNST
BY
H. K. Parsons
ATTORNEY.

Patented Oct. 1, 1940

2,216,550

UNITED STATES PATENT OFFICE 2,216,550

MACHINE TOOL CONTROL MECHANISM

Hans Ernst, Cincinnati, Ohio, assignor to The Cincinnati Milling Machine Co., Cincinnati, Ohio, a corporation of Ohio Application August 1, 1938, Serial No. 222,417

19 Claims. (Cl. 90—21.5)

This invention relates to milling machines and more particularly to improvements in transmission and control mechanism therefor.

One of the objects of this invention is to simplify the transmission and control mechanism of a milling machine so that a single lever will suffice to control the operating cycle of the machine.

Another object of this invention is to provide an improved one-way, automatic cycle control mechanism for a milling machine.

A further object of this invention is to provide an improved hydraulic control circuit of a milling machine having improved means for manually or automatically shifting the main control valves thereof.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is a front elevation of a machine tool to which this invention is particularly adaptable.

Figure 2 is a diagram of a hydraulic control circuit.

Figure 3 is a detail view of one form of actuating mechanism for one of the control valves.

This invention deals with improvements in transmission and control mechanism for machine tools and is particularly adaptable to machine tools of the class known as milling machines, one form of which is illustrated by way of example in Figure 1 of the drawings.

A machine shown in this figure has a work table 10 which is movable transversely with respect to the axis of a cutter spindle 11 to feed a work piece past a cutter 12. One well-known cycle of operation of such a machine is known as a one-way cycle in which the table is advanced at a feed rate relative to a cutter to effect stock removal from a work piece, and then the table is reversed and returned to a starting position at a rapid traverse rate. The table is stopped and the finished work piece is replaced by a new piece of work. It is desirable that, once this cycle is started, it will continue automatically until the table is returned to the starting position so that the operator's only duty is to change the work piece and start the cycle.

By means of this invention a simplified control circuit is provided having a minimum number of parts and a single control which is effective for starting the cycle and which is operable at will to stop the cycle and return the table to a starting position.

Figure 4:
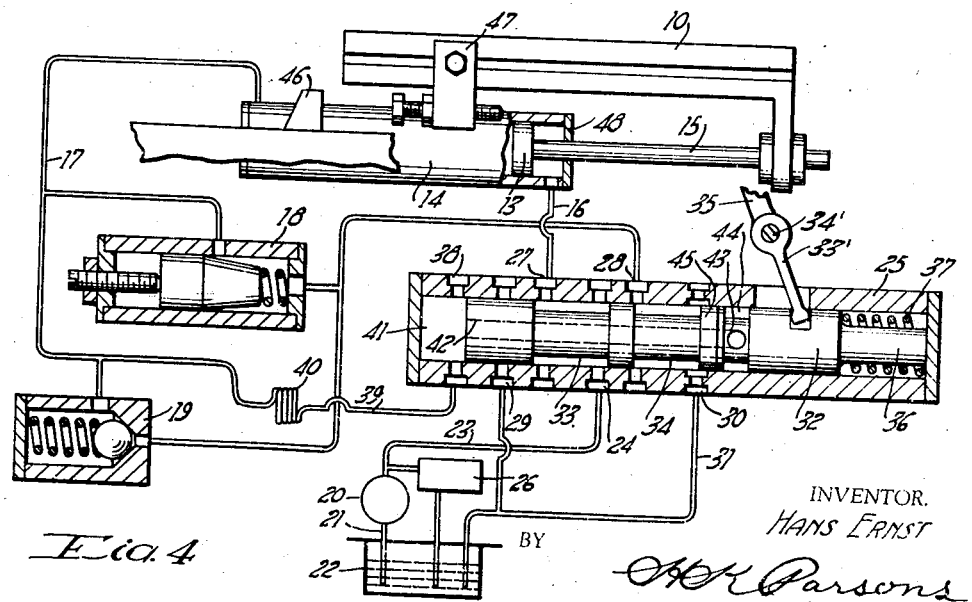
Figure 4 is a diagram of a simplified hydraulic control circuit embodying the principles of this invention.

The table 10 is actuated by means of a piston 13 contained in a cylinder 14 and operatively connected by a piston rod 15 to the table. The simplest form of the control circuit of this invention is shown in Figure 4 of the drawings and will be described first. The opposite ends of the cylinder 14 have the channels 16 and 17 connected thereto for alternately conveying fluid under pressure to the piston and cylinder motor for effecting opposite directions of actuation of the table.

Means are provided whereby, when the fluid flows to the motor through channel 16 and simultaneously returns through channel 17, that the table will move forward at a feed rate; and when the fluid flows to the motor through channel 17 and simultaneously returns through channel 16 the table will return at a rapid traverse rate. Although the volumetric supply is the same in each case, means are provided for automatically changing the rate consisting of a throttle valve 18 serially arranged in one of the channels, it being illustrated in Figure 4 as serially arranged in channel 17. The throttle valve thus retards the flow of fluid returning from the cylinder through channel 17. In order that the fluid may flow at a more rapid rate in the opposite direction to effect rapid traverse movement of the table, a check valve 19 is connected in channel 17 in parallel relation to the throttle valve and so positioned that when the direction of flow is toward the cylinder the check valve will open and permit the fluid to bypass around the throttle valve. When the flow is in the opposite direction the check valve will automatically close, forcing the fluid through the throttle valve.

The working pressure fluid is supplied to the circuit by a single pump 20 which has an intake 21 through which fluid is withdrawn from a suitably located reservoir 22; and a delivery channel 23 which is connected to port 24 of a direction control valve 25. A suitable relief valve 26 may be connected to the channel 23.

The reversing valve 25 has a pair of ports 27 and 28 to which the ends of channels 16 and 17 are respectively connected. The valve also has a pair of ports 29 and 30 which are connected to the return channel 31.

The reversing valve is provided with a shiftable plunger 32 in which is formed a pair of annular grooves 33 and 34. When the plunger is in the left hand position the pressure port 24 is connected to port 28 whereby fluid is delivered through channel 17 to the left hand end of cylinder 14 to effect a rapid return movement of the table and when the plunger is shifted to the right the pressure port 24 is connected to port 27, whereby fluid is delivered to the motor through channel 16 to effect a feeding movement of the table. Thus, the plunger 32 determines the direction of movement of the table, while automatic means responsive to the direction of flow through the circuit determines the rate.

By means of this invention the plunger 32 may be shifted to and held in the feed forward position, that is, to the right to establish one operative condition in the circuit, and in such a manner that it may be easily and quickly shifted by manual means, or automatically shifted by trip operable means to its other position. To this end, plunger 32 is operatively connected to a ball-ended lever 33' keyed to a shaft 34' which is operatively connected to a manual control lever 35 located on the front of the machine whereby rotation of the lever in a counterclockwise direction will shift the plunger 32 into its feed position.

One end of the plunger 32 has a reduced portion 36 which is surrounded by a spring 37. Thus, when the plunger is shifted to the right the spring 37 is compressed or loaded, thereby producing a continuous urge to effect return movement of the plunger. This return movement is prevented, however, by hydraulic means which is effective to hold the plunger in its feed position against the urge of the spring but which is sufficiently yieldable that it may be overcome by manual pressure on the lever 35, whereby after a small return movement the pressure will be automatically reduced to permit completion of the movement. Means are also provided whereby this pressure may be automatically reduced by the table so that the plunger may be shifted automatically.

To this end the valve housing 25 is provided with a port 38 which is located a prescribed distance from the end of the housing so that the port will not be fully uncovered until the plunger 32 has reached the end of its stroke to the right. This port is connected through a channel 39 having a hydraulic resistance 40 serially arranged therein to the return channel 17. Thus, when the plunger 32 is shifted to a feed position, pressure fluid will flow through channel 16 into the right hand end of cylinder 14, causing movement of the piston 13 and a creation of pressure in the channel 17. This pressure will be communicated through the resistance 40 to the space 41 which will fill up with fluid pressure and hold the plunger 32 against the reaction of spring 37.

The plunger 32 is provided with an axial bore 42 which is drilled in the left hand end of the plunger and terminates in a cross bore 43 which communicates with an annular groove 44. The exhaust port 30 in the valve housing is closed by the spool 45 when the plunger is to the right, but upon a slight movement to the left the annular groove 44 begins to register with the return port 30 whereby the fluid in space 41 will have a direct outlet to reservoir. The longer this movement continues, the greater will be the drop in pressure, thus accelerating the movement.

One means for automatically reducing the pressure in chamber 41 is to provide a positive stop means for the table 10 which will become effective after the work has passed the cutter. This may include a positive abutment 46 and an adjustable dog 47 carried by the table whereby after contact is established between these two, the table will stop and the fluid pressure in channel 17 will dissipate through the throttle valve, thereby gradually reducing the pressure in chamber 41 of the reversing valve. When the pressure in this chamber drops below the force of the spring 37, the plunger 32 will be shifted to the left, thereby establishing hydraulic connections which will effect a rapid return movement of the table.

If no other means are provided, the table will continue its return movement until the piston 13 contacts the cylinder head 48 which will thus serve as a positive stop to limit the return movement.

It should now be evident that a one-way automatic cycle of operation of the table may be accomplished with the circuit shown in Figure 4 in the following manner:

With the reversing valve 32 in its left hand position, the operator throws the lever 35 to shift the valve 32 into its right hand position, thereby connecting the pump to the right hand end of cylinder 14, whereby the table will move to the left at a feed rate controlled by the setting of the feed rate valve 18. The operator holds the reversing valve in its right hand position against the urge of spring 37 until sufficient pressure is built up in the chamber 41 to overcome the force of spring 37. The feeding movement will continue until the dog 47 engages the positive stop which will result in a pressure drop in the chamber 41 and automatic shifting of the reversing valve plunger 32 to the left which will thereby transfer the pump connection to the left end of cylinder 14. The return movement will then take place and continue until the piston 13 contacts the cylinder head 48 which thereby serves as a stop means to limit the return movement. The parts will remain in this position until the operator again shifts the reversing valve to a forward feed position.

Attention is invited to the fact that at any time the operator may stop, at will, the feeding movement and cause the table to return to a starting position by throwing the lever 35 in a clockwise direction. This will shift the plunger 32 a sufficient distance to connect the annular groove 44 with the exhaust port 30, causing a reduction in pressure in the chamber 41. This is possible due to the hydraulic resistance 40 which retards the inflow of fluid to the chamber.

Since the total hydraulic pressure on one end of plunger 32 is only slightly greater than the pressure of the spring 37 on the other end due to the selection of the proper value for the resistance 40, the plunger 32 may be readily shifted in this manner without appreciable delay.

In Figure 2 of the drawings alternative forms of means for automatically reducing the pressure in chamber 41 to cause automatic tripping of the reverse valve and for automatically stopping the return movement of the table are shown and will now be described. In this figure, the channel 17 is connected to the chamber 41 through channel 50, hydraulic resistance 51 and channel 53. The channel 53 has a branch line 52 which is connected to port 54 of a by-pass valve 55.

The valve 55 has a spring plunger 56 in which is formed an annular groove 57. The valve also has a port 58 which is connected to the return channel 59, and this port is normally closed by the plunger 56. When the plunger 56 is depressed, however, against the resistance of spring 59', the port 54 is connected to port 58 whereby the fluid in chamber 41 will immediately pass to reservoir through channels 53, 52 and 59. When this happens, the opposition to spring 37 is removed so that the plunger 32 is immediately shifted to the left. The hydraulic resistance 51 also serves as a choke to prevent too great a loss of fluid from the channel 17.

The means for stopping the return movement of the table shown in Figure 4 is not adjustable, and therefore, an alternative means is shown in Figure 2, whereby the stop position of the return movement of the table may be varied. This means comprises a stop valve 65 having a plunger 66 which is shown in its running position whereby the channel 16 is open. When the plunger is shifted to the left, the channel is closed to stop movement of the table. Operating mechanism has been provided for the valve plunger whereby it may be shifted manually from either position to the other, or may be automatically shifted to its stop position. Referring to Figure 3, this mechanism includes an oscillatable shifter 67, having a lost motion connection at 68 with the plunger 66. The shifter 67 has an integral lug 69 which is adapted to engage a wing 70 of a pivoted lever 71. This lever has a pin connection 72 with a vertical trip plunger 73. The trip plunger is mounted adjacent to the work table 10 for actuation by a suitably positioned trip dog 74. A spring 75 surrounds the plunger between a fixed part 76 of the machine and a collar 77 pinned to the plunger whereby the spring tends to hold the plunger in its upper extreme position. This position is determined by a second collar 78 attached to the plunger and engaging the underside of the fixed part 76. The lever 71 has an integral pawl 79 which is adapted to engage the inclined surface 80 on the plunger 66 for latching the same in a running position against the opposition of the spring 81, which is interposed between the end of the plunger and the valve housing.

For automatic operation, the dog 74 is positioned on the table to depress the plunger 73 at the desired point in the travel of the table. When the plunger is depressed, the lever 71 is rotated in a counterclockwise direction, removing the pawl 79 from the path of the plunger whereby the spring 81 will shift the same to a stop position. For manual operation the shaft 82, to which the shifter 67 is attached, is rotated by a manual control lever 83. When rotated in a counterclockwise direction, the plunger is shifted to a running position and latched by the pawl 79. If the lever is rotated in a clockwise direction, the lost motion at 68 will permit sufficient rotation of the shifter 67 that the lug 69 acting on the wing 70 of lever 71 may rotate the lever in a counterclockwise direction, thus unlatching the pawl 79 whereby the spring 81 will power shift the plunger 66.

The manner of operation of the circuit shown in Figure 2 is substantially the same as that shown in Figure 4 with the exception that the stop valve may be shifted to a stop position at will by the operator without causing return movement of the table and the point at which the table will stop on its return stroke may be varied. In this circuit it is necessary for the operator to actuate two levers to start the cycle, and therefore, a modified form of the circuit is shown in Figure 5, whereby only one control lever is necessary even though a stop valve is provided.

Figure 5:
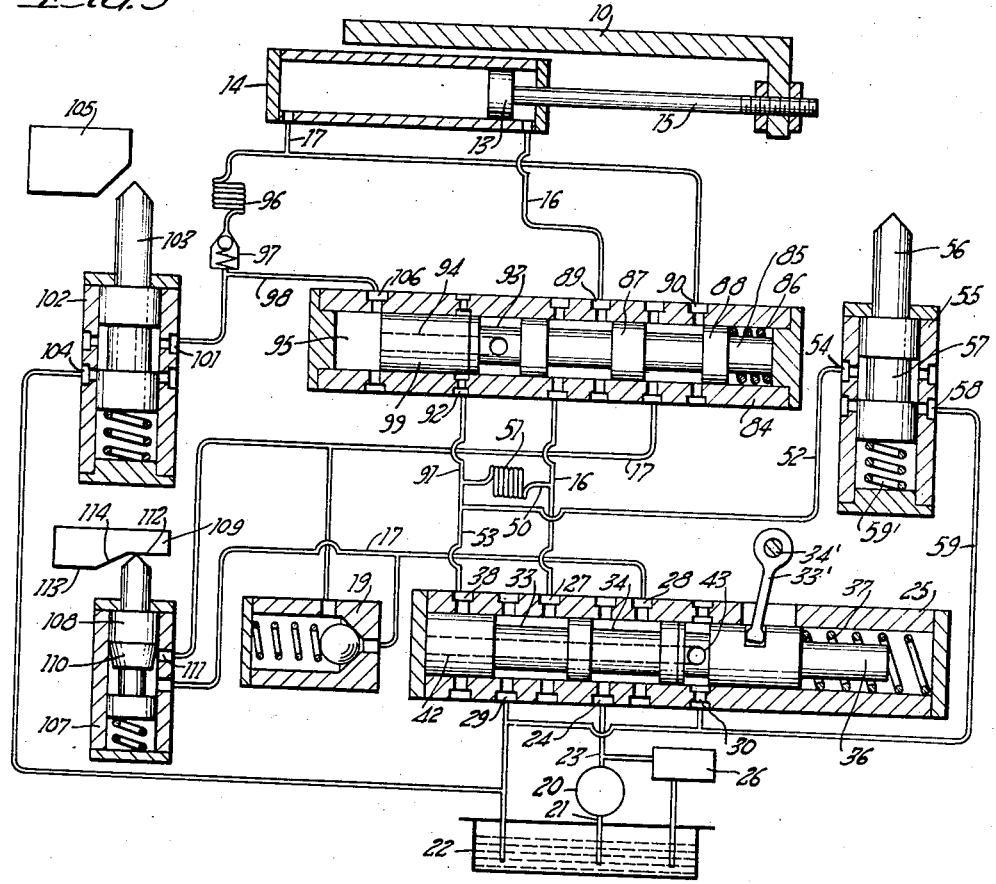
Figure 5 is a diagram of another modification of the hydraulic control circuit.

In Figure 5 the reversing valve 25 is still connected to opposite ends of the cylinder 14 through channels 16 and 17 and the chamber 41 of the reversing valve is connected to the trip operable valve 55 for automatically releasing the pressure therein upon completion of the feeding movement of the table. In this figure, both of the channels 16 and 17 run through the stop valve 84 whereby, when the plunger 85 of the stop valve is in the position shown, both channels are open, but when the plunger is shifted to the left by the spring 86, the spools 87 and 88 on the plunger close ports 89 and 90 respectively to impound the fluid in opposite ends of the cylinder.

The pressure fluid for holding the reversing valve in a running position is supplied from channel 16 through resistance 51 and channel 53. The channel 53 has a branch line 91 which is connected to port 92 of the stop valve. When the plunger 85 is in a stop position, that is to the left, the port 92 registers with an annular groove 93 formed in the plunger. An interdrilled passage 94 formed in the plunger connects the annular groove 93 with the chamber 95. Thus, when the reversing valve plunger is moved to its feed position to connect the pump 20 to channel 16, a part of this fluid is forced through the resistance 51, branch line 91, port 92, groove 93 and passage 94 to chamber 95. This will result in pressure shifting of the stop valve plunger 85 to the right against the resistance of spring 86 to start the cycle. The result will be that the channels 16 and 17 are opened whereby the fluid pressure will continue to the right end of cylinder 14, causing movement of the piston which will thereby create pressure in the channel 17 due to the resistance of the rate control valve 18. This rise in pressure in channel 17 will force fluid through the resistance 96, check valve 97 and channel 98 to chamber 95.

The pressure fluid flowing through port 92 to effect initial shifting of the stop valve plunger to the right is not able to complete the movement due to the closure of port 92 by the spool 99 on the plunger. But when pressure has been built up in channel 17, the fluid forced through resistance 96 to channel 98 will complete the movement and incidentally close port 92.

The feeding movement will continue until a dog 100 positioned on the table trips the valve 55, causing release of the hydraulic pressure in chamber 41. The spring 37 will immediately shift the reversing valve plunger 32 into its return position. The channel 16 is now connected to reservoir and the channel 17 is connected to the pump 20. It will be noted that the channel 17 is still under pressure and therefore the stop valve plunger 99 will still be held in a running position.

The channel 98 is connected to a port 101 of a trip operable valve 102 which is similar in construction to valve 55. It has a trip plunger 103 and an exhaust port 104 which is adapted to be interconnected to port 101 when the plunger is depressed. A trip dog 105 is attached to the table for depressing the plunger 103 when the table is returned to a starting position. It will be obvious that when the plunger 103 is depressed that the fluid pressure in chamber 95 will have a direct passage to reservoir whereby the spring 86 will come into action to shift the plunger 85 into a stop position. Since the table will stop with the dog 105 on top of the plunger 103, the channel 98 will remain connected to reservoir while the table is in a stop position and also when the reversing valve is shifted to start the next cycle. This will not interfere with the power shifting of the stop valve when pressure is again connected to port 92 because the port 106 to which the channel 98 is connected does not open until the plunger 85 has almost completed its movement.

In other words, the port 106 will begin to open at the same time that the port 92 begins to close. At this moment the stop valve has already been shifted a sufficient distance to partially open channels 16 and 17 whereby fluid pressure can build up in the right hand end of the cylinder and start the movement of the table. Movement of the table will remove the dog 105 from contact with plunger 103, closing valve 102 and building up pressure in channel 17 so that fluid can be supplied through channel 98 to complete the shifting movement of the stop valve plunger.

It should also be noted that as soon as valve 102 closes, the channel 98 will become a closed channel due to the check valve 97, whereby the pressure fluid entering port 92 can gradually continue the movement, even though the port 92 is gradually being closed, thereby uncovering port 106 so that when the pressure in channel 17 equalizes with the pressure in chamber 95, it will open the check valve 97, and thereby pick up and complete the movement of the plunger 85.

This will also result in the port 92 being completely closed and this is necessary so as to prevent any leakage from chamber 95 when the channel 52 is open to reservoir at the end of the feeding movement to effect trip operation of the reversing valve.

It is sometimes desirable in a one-way cycle that a rapid traverse movement be effected at the beginning of the cycle so as to move the work quickly up to the cutter and this can be accomplished in the present circuit by providing an automatically adjustable feed rate control valve which is indicated generally in Figure 5 by the reference numeral 107. This valve has a spring pressed plunger 108 which is continuously urged toward a template 109 carried by and movable with the table. The plunger has a cone-shaped portion 110 which is movable relative to a port 111 to vary the incoming flow therethrough to vary the feed rate. The template may have a portion cut away to form a surface 112 which, at the beginning of the cycle, will permit the plunger 108 to rise and fully open port 111, whereby a rapid movement of the table may take place until the work is near the cutter.

A second surface 113 may be provided on the template for depressing the plunger the amount necessary to produce the desired feed rate.

The surfaces 112 and 113 may be connected by an inclined surface 114 of proper angle to form easy transition from one surface to the other. It will be obvious that the template 109 may be removed and other templates substituted therefor to give desired lengths of feed and rapid traverse movements, and also to produce different feed rates.

There has thus been provided an improved operating and control mechanism for a machine tool which will yield a one-way automatic cycle of operation incorporating all the desirable features of variation in rate and length of stroke, yet having only one operating control lever.

What is claimed is:

1. In a control system for a machine, the combination of a two-position control member, resilient means normally urging the member to one position, hydraulic means responsive to movement of the member to a second position for holding the member in said second position against the force of said resilient means, and means for reducing the pressure of said hydraulic means to permit automatic return of said member by said resilient means to its first named position.

2. In a device of the class described, the combination of a manual control lever movable from a first position to a second position to change the operating conditions of a machine, and different means for holding the lever in its respective positions, one of said means being releasable to permit automatic shifting of said lever by the other of said means from one of said positions to the other.

3. In a device of the class described, the combination of a manual control lever movable from a first position to a second position to change the operating conditions in a machine, different means for holding the lever in its respective positions, one of said means being releasable to permit automatic shifting to one of said positions, said releasable means being effective after a predetermined movement of said lever to the other of said positions to assist the movement of the lever.

4. In a device of the class described, the combination with a control lever operatively connected for establishing two different operating conditions in a machine upon oscillation of the lever, of a crank arm connected to said lever, a plunger connected to said crank arm for reciprocation thereby, said plunger being mounted in a cylinder, resilient means in one end of said cylinder for urging the plunger and thereby the lever to one of its operative positions, a source of pressure terminating in a port in said cylinder, said port being closed by said plunger when held in one extreme position by said resilient means, said port being uncoverable upon initial movement of said plunger whereby said hydraulic pressure will aid in shifting said plunger and thereby the lever to its other operating position.

5. In a device of the class described, a movable control lever operatively connected for establishing two different operating conditions in a machine, a crank arm operatively connected to said lever, a relatively movable piston and cylinder, one of which is connected to said crank and the other fixed, a source of fluid pressure operatively connected to one end of the cylinder for holding the piston and thereby the lever in one operating position, and means responsive to partial movement of said piston for reducing the pressure in the cylinder and thereby permit movement of the lever to its other operating position.

6. In means for automatically holding a shiftable member in either one of two operating positions, the combination of a relatively movable piston and cylinder, one of which is operatively connected to said member and the other fixed, said cylinder having a pair of spaced ports, one of which is connected to pressure and the other to exhaust, a spool formed on said piston having a length substantially equal to the spacing of said ports whereby upon movement of the member in one direction said pressure port will be opening and the exhaust port closing causing admission of pressure to said cylinder to assist said movement, positive means for stopping said movement when the exhaust port has been closed, and means to shift said member sufficient to uncover said exhaust port to effect movement in the other direction.

7. In means for automatically holding a shiftable control member in either one of two operating positions, the combination of a relatively movable piston and cylinder, one of which is operatively connected to said member and the other fixed, said cylinder having a pair of spaced ports, one of which is connected to pressure and the other to reservoir, a spool formed on said piston having a length substantially equal to the spacing of said ports whereby upon movement of the member in one direction said pressure port will be opening and the exhaust port closing causing admission of pressure to said cylinder to assist said movement, positive means for stopping said movement when the exhaust port becomes closed, said member being shiftable in the opposite direction to uncover said exhaust port and thereby reduce the pressure to effect movement in the other direction, and resiliently operable means for holding the member in the last named position.

8. In a machine having a control lever movable from one operating position to a second operating position, the combination of means for finally determining the position of said lever including a piston and cylinder, one of which is operatively connected to the lever and the other fixed, a pressure port and an exhaust port connected to said cylinder, means in the piston when in a mid position for connecting both of said ports to one end of the cylinder, means responsive to movement of the piston in one direction for closing said pressure port and opening said exhaust port to reduce the back pressure on said piston, said means also operating upon movement of the piston in an opposite direction to increase the opening of the pressure port and decrease the opening of the exhaust port whereby, when said exhaust port is closed, the pressure in the cylinder will act as a holding means for said lever.

9. In a machine tool having a control lever movable to two different positions for determining different operating conditions in the machine, detent means for holding the lever in its different positions, including a piston and cylinder, one of which is connected to said lever and the other fixed, a pressure port connected to the cylinder for delivering fluid pressure to one end thereof, an exhaust port connected to said cylinder, means within the piston for establishing communication between said exhaust port and said end of the cylinder, means for holding the piston in a position wherein the pressure port is closed and the exhaust port opened, means to supply fluid pressure to said pressure port including a hydraulic resistance, said piston being movable in a direction to uncover said pressure port and restrict said exhaust port whereby the pressure fluid admitted to the cylinder will assist said movement, said pressure rising to a maximum when the exhaust port is closed, and means connected to said pressure supply means between said resistance and said pressure port for releasing the pressure in the end of said cylinder whereby said resilient means will automatically return the lever to its other position.

10. In a machine tool having a control lever movable to two different positions for determining different operating conditions in the machine, detent means for holding the lever in its different positions, including a piston and cylinder, one of which is connected to said lever and the other fixed, said cylinder having a pressure port near one end thereof and an exhaust port, means within the piston for establishing communication between said ports, means for holding the piston in a position for closing said pressure port and uncovering said exhaust port, means to supply fluid pressure to said pressure port including a hydraulic resistance, said lever being movable in a direction to uncover said pressure port and restrict said exhaust port whereby the pressure will rise in the end of the cylinder to assist said movement, said pressure rising to a maximum when the exhaust port is closed, and trip operable means for releasing the pressure in said end of said cylinder to permit return movement of the lever.

11. In a machine tool having a fluid operable slide and a source of operating pressure therefor, the combination with a control valve having different positions for determining different operating conditions in the machine, of a control lever operatively connected to said valve, resiliently operable means normally effective for holding said valve in one operating position, said valve having a fluid operable portion, means responsive to movement of the valve in opposition to said resilient means for admitting fluid pressure to said fluid operable portion to thereby increase the pressure on said portion to assist said movement, and means to increase the pressure as the movement continues until it is greater than said resiliently operable means whereby said fluid pressure will hold the valve in its other operating position.

12. In a machine tool having a fluid operable slide and a source of pressure, the combination with a control valve having different positions for determining different operating conditions in the machine, of a control lever operatively connected to said valve, resiliently operable means normally effective for holding said valve in one operating position, said valve having a fluid operable portion, means responsive to movement of the valve in opposition to said resilient means for admitting fluid pressure to said fluid operable portion to increase the pressure thereon to assist said movement, means to increase the pressure as the movement continues until it is greater than said resiliently operable means whereby said fluid pressure will hold the valve in its other operating position, and a trip operable valve actuable by said slide for reducing the pressure on said portion below that of said resiliently operable means whereby said resiliently operable means will shift said valve to its former position.

13. In a machine tool having relatively movable tool and work supports, the combination of means for controlling said relative movement, including a piston and cylinder, a source of fluid pressure, a reversing valve for connecting said source of fluid pressure to said cylinder, resiliently operable means for positioning said reversing valve in one position for effecting one direction of actuation of said work support, a manually operable control lever connected to said valve, means responsive to movement of said valve by said lever for admitting fluid pressure to assist said movement, said pressure increasing upon continued movement of said valve until the resistance of said resiliently operable means is overcome whereby said fluid pressure will hold the valve in its other position, and means trip operable by the moving support for releasing said pressure and permitting said resiliently operable means to return the valve to its former position.

14. In a milling machine having a traveling work support, the combination of transmission means including a hydraulic motor for imparting movement to the support, separate channel means for conveying fluid to and from said motor, said channel means having a feed rate throttle therein, automatic means for rendering the throttle effective during fluid flow in one direction through said channels and ineffective during fluid flow in the other direction, a source of fluid pressure, a shiftable valve for determining the channel to be connected to pressure and thereby the direction of movement of the table, hydraulic pressure means for holding the valve in one position, means automatically operable by the table for releasing said pressure holding means, and means for shifting said valve to its other position when said pressure means is released to reverse the movement of the table.

15. In a milling machine having a traveling work support, the combination of transmission means including a hydraulic motor for imparting movement to the support, separate channel means for conveying fluid to and from said motor, said channel means having a feed rate throttle therein, automatic means for rendering the throttle effective during fluid flow in one direction and ineffective during fluid flow in the other direction through said channels, a source of fluid pressure, a shiftable valve for determining the channel to be connected to pressure and thereby the direction of movement of the table, hydraulic pressure means for holding the valve in one position to effect advance of the table, means automatically operable by the table for releasing said pressure holding means, means for shifting said valve when said pressure means is released to effect return movement of the table, and positive means to stop the return movement of the table.

16. In a machine tool having a cutter support and a work support, the combination of transmission means for effecting relative movement between the supports including a piston and cylinder, one of which is connected to the moving support, a source of pressure, separate channels connected to opposite ends of said cylinder, a feed rate throttle in one of said channels, automatic means for rendering the throttle effective during one direction of flow through said channel and ineffective during flow in the opposite direction, a reversing valve for connecting said source of pressure to said channels, manually operable means for shifting said valve to a feed position, fluid operable means for holding the valve in said position, means for supplying fluid pressure to said fluid operable means from one of said channels, a positive stop for determining the limit of the feeding movement and causing a drop in the fluid pressure acting on said valve holding means, a spring for shifting the reversing valve upon said drop in pressure to change the direction of movement of the table, and means for stopping said return movement.

17. In a milling machine having a cutter support and a work support, the combination of transmission control means for said work support including a piston and cylinder, one of which is connected to the support, an hydraulic circuit comprising a feed channel and a rapid traverse channel connected to opposite ends of the cylinder, a source of fluid pressure, a reversing valve for connecting said source selectively to said channels to effect opposite directions of support movement at different rates, manually operable means for shifting the reversing valve into a position to connect the pump to said feed channel, means to utilize the pressure in the circuit for holding said valve in its feed position, means operable by the table for releasing said holding pressure at the end of the feeding movement, and resiliently operable means for shifting said valve to its other position to connect the pump to the rapid traverse channel.

18. In a milling machine having a cutter support and a work support, the combination of an hydraulic circuit for effecting relative movement between the supports including an hydraulic motor, separate channels leading to said motor, one of said channels having a feed rate throttle therein, source of fluid pressure, a control lever, valve means shiftable in response to movement of the lever for connecting said source of pressure to one of said channels to effect feeding of the table, means to utilize the pressure fluid in the circuit for holding said valve means in lever shifted position, automatic means for releasing the holding pressure, and resiliently operable means for oppositely shifting said valve means when said holding pressure is released.

19. In a milling machine having a cutter support and a work support, the combination of an hydraulic actuating and control circuit for effecting relative movement between the supports including a piston and cylinder one of which is fixed and the other connected to the movable support, a pair of channels connected to the respective ends of said cylinder, a source of pressure, valve means for determining the channel to be connected to said source of pressure, a control lever effective for positioning said valve means to effect advance of the movable support, resiliently operable means for returning said valve means, and means to utilize part of the fluid in said circuit for holding said valve means in lever shifted position against said resiliently operable means.

HANS ERNST.